US011325268B2

(12) United States Patent
Son et al.

(10) Patent No.: US 11,325,268 B2
(45) Date of Patent: May 10, 2022

(54) ELECTRONIC DEVICE AND METHOD FOR CALCULATING AT LEAST ONE PARAMETER FOR MEASURING EXTERNAL FORCE

(71) Applicant: SAMSUNG ELECTRONICS CO., LTD., Suwon-si (KR)

(72) Inventors: Seungwoo Son, Suwon-si (KR); Kyungshik Roh, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 364 days.

(21) Appl. No.: 16/433,247

(22) Filed: Jun. 6, 2019

(65) Prior Publication Data
US 2020/0070369 A1 Mar. 5, 2020

(51) Int. Cl.
*B25J 19/02* (2006.01)
*B25J 9/16* (2006.01)
(52) U.S. Cl.
CPC .............. *B25J 19/02* (2013.01); *B25J 9/1633* (2013.01); *B25J 9/1641* (2013.01)
(58) Field of Classification Search
CPC ........ B25J 19/02; B25J 9/1641; B25J 9/1633; B25J 9/1694; B25J 13/085; B25J 9/1638; G05B 2219/37581; G05B 2219/40599
(Continued)

(56) References Cited

U.S. PATENT DOCUMENTS 4,589,810 A * 5/1986 Heindl ..................... B25J 13/02
414/4
4,621,332 A * 11/1986 Sugimoto .............. B25J 13/085
318/568.17
(Continued)

FOREIGN PATENT DOCUMENTS

DE 102009049329 A1 * 4/2011 ............ B25J 9/1633
JP 2008006517 A * 1/2008
(Continued)

OTHER PUBLICATIONS

JP2012040634A-translate. Calibration Device and Method for Power-Controlled Robot. (Year: 2012).*
(Continued)

*Primary Examiner* — B M M Hannan
(74) *Attorney, Agent, or Firm* — Nixon & Vanderhye P.C.

(57) ABSTRACT

Disclosed is an electronic device including a robot arm configured to include at least one coupling portion configured to be coupled to a force sensor to which a specified object is attached, at least one actuator configured to drive the robot arm such that a position of the at least one coupling portion is changed, and a processor electrically connected to the actuator, wherein the processor is configured to: receive a first measurement value of the force sensor due to a weight of the specified object with respect to a first position of the at least one coupling portion, receive a second measurement value of the force sensor due to the weight of the specified object with respect to a second position of the at least one coupling portion, receive a third measurement value of the force sensor due to the weight of the specified object with respect to a third position of the at least one coupling portion, and estimate a relationship between a first coordinate system relative to the at least one coupling portion and a second coordinate system relative to the force sensor based at least on at least the first measurement value, the second measurement value, and the third measurement value to calculate a magnitude of an external force acting on the specified object.

17 Claims, 8 Drawing Sheets

(58) Field of Classification Search
USPC .................. 700/251, 253, 258, 260, 261
See application file for complete search history.

(56) References Cited

U.S. PATENT DOCUMENTS

| | | | | | |
|---|---|---|---|---|---|
| 4,974,210 | A | * | 11/1990 | Lee | B25J 9/1682 700/260 |
| 5,497,061 | A | * | 3/1996 | Nonaka | B25J 9/1633 318/568.1 |
| 8,321,054 | B2 | * | 11/2012 | Seines | G05B 19/423 700/254 |
| 9,827,678 | B1 | * | 11/2017 | Gilbertson | B25J 18/025 |
| 2004/0128030 | A1 | * | 7/2004 | Nagata | B25J 9/1633 700/245 |
| 2009/0259412 | A1 | * | 10/2009 | Brogardh | B25J 9/1633 702/41 |
| 2011/0040407 | A1 | * | 2/2011 | Lim | B25J 9/1638 700/253 |
| 2012/0022690 | A1 | * | 1/2012 | Ooga | B25J 9/1633 700/258 |
| 2013/0116706 | A1 | * | 5/2013 | Lee | A61B 34/30 606/130 |
| 2014/0018820 | A1 | * | 1/2014 | Lim | A61B 34/76 606/130 |
| 2014/0025205 | A1 | * | 1/2014 | Inazumi | B25J 9/1633 700/258 |
| 2015/0290798 | A1 | * | 10/2015 | Iwatake | B25J 13/085 700/257 |
| 2015/0290810 | A1 | * | 10/2015 | Iwatake | B25J 9/1651 700/258 |
| 2018/0169854 | A1 | * | 6/2018 | Shiratsuchi | B25J 9/10 |
| 2018/0243899 | A1 | * | 8/2018 | Hashimoto | B25J 9/1633 |
| 2019/0091861 | A1 | * | 3/2019 | Kasai | B25J 13/085 |

FOREIGN PATENT DOCUMENTS

| | | | | | |
|---|---|---|---|---|---|
| JP | | 2011235374 | * | 11/2011 | B25J 13/00 |
| JP | | 2012040634 | A * | 3/2012 | B25J 9/10 |
| JP | | 5327722 | B2 * | 10/2013 | B25J 13/00 |
| KR | 10-2000-0021209 | | | 4/2000 | |
| KR | | 20000021209 | * | 4/2000 | B25J 19/02 |

OTHER PUBLICATIONS

DE 102009049329A1-translate. Method for controlling a welding robot, for welding with a welding tong and a force detecting device for detecting reaction forces on the welding tong, comprises determining a sum of reaction forces on the welding tong. (Year: 2011).*
JP5327722B2-translate. Device and Method for Estimating Load of Robot (Year: 2011).*
KR20000021209-Translate. Automatic Compensation Method of Force and Torque Sensor for Gravity Weight. (Year: 200).*
JP2008006517.Abstract.translate (Year: 2008).*
JP2008006517.translate (Year: 2008).*

* cited by examiner

ELECTRONIC DEVICE AND METHOD FOR CALCULATING AT LEAST ONE PARAMETER FOR MEASURING EXTERNAL FORCE

CROSS-REFERENCE TO RELATED APPLICATION

This application is based on and claims priority under 35 U.S.C. § 119 to Korean Patent Application No. 10-2018-0103583, filed on Aug. 31, 2018, in the Korean Intellectual Property Office, the disclosure of which is incorporated by reference herein its entirety.

BACKGROUND

1. Field

The disclosure relates to a method of calculating at least one parameter for measurement of an external force and an electronic device for performing the same.

2. Description of Related Art

With the development of technology, various types of electronic devices are being developed. In particular, electronic devices such as robots capable of performing various functions are emerging in a wide range of fields. Although the robot is conventionally limited to an industrial robot, the use and application fields of the robot, such as general service or medical service have been gradually expanded in recent years.

The robot may be configured to perform a function similar to a human's arm. For example, the robot may grip a designated object, and may perform a designated operation, for example, painting, welding, and the like, at a specified position. The electronic device, such as the robot, may include a robot arm similar to a human's arm, and a force sensor may be coupled to the robot arm. A specified object for performing various operations may be attached to the force sensor.

The above information is presented as background information only to assist with an understanding of the disclosure. No determination has been made, and no assertion is made, as to whether any of the above might be applicable as prior art with regard to the disclosure.

A user may provide an external force to the specified object included in the electronic device. For example, the user may provide an external force to change a position of the specified object to a specific position so as to allow the electronic device to perform a specified operation on the specific position. In this case, the electronic device may need to accurately measure the external force for compliance or response to the external force. For example, the electronic device may calculate a strength or direction of an actual external force generated with respect to the specified object through an external force against a force sensor, for example, a force sensed by the force sensor. To this end, the electronic device may need to perform coordinate transformation on the strength or direction of the force sensed by the force sensor.

In performing the coordinate transformation, the electronic device may assume that the force sensor is correctly assembled or attached to one side of the electronic device. For example, the electronic device may assume a fixed value as a coordinate transformation matrix between a connecting portion of the electronic device and the force sensor. However, the force sensor may be detachable and an error may occur in a process of attaching the force sensor to the electronic device. The error may affect the strength or direction of the actual external force calculated by the electronic device. Thus, the electronic device may fail to accurately calculate the external force, and the compliance or response to the external force may also be unnatural.

SUMMARY

Example aspects of the disclosure address at least the above-mentioned problems and/or disadvantages and provide at least the advantages described below. Accordingly, an example aspect of the disclosure provides an electronic device for addressing the above-mentioned problems and the problems raised herein.

In accordance with an example aspect of the disclosure, an electronic device may include a robot arm configured to include at least one coupling portion configured to be coupled to a force sensor to which a specified object is attached, at least one actuator configured to drive the robot arm such that a position of the at least one coupling portion is changed, and a processor electrically connected to the actuator, wherein the processor is configured to: receive a first measurement value of the force sensor due to a weight of the specified object with respect to a first position of the at least one coupling portion, receive a second measurement value of the force sensor due to the weight of the specified object with respect to a second position of the at least one coupling portion, receive a third measurement value of the force sensor due to the weight of the specified object with respect to a third position of the at least one coupling portion, and estimate a relationship between a first coordinate system relative to the at least one coupling portion and a second coordinate system relative to the force sensor, based at least on the first measurement value, the second measurement value, and the third measurement value to calculate a magnitude of an external force acting on the specified object.

In accordance with another example aspect of the disclosure, a method for calculating at least one parameter for measuring an external force may include receiving a first measurement value of a force sensor due to a weight of a specified object with respect to a first position of at least one coupling portion configured to be coupled to the force sensor to which the specified object is attached, receiving a second measurement value of the force sensor due to the weight of the specified object with respect to a second position of the at least one coupling portion, receiving a third measurement value of the force sensor due to the weight of the specified object with respect to a third position of the at least one coupling portion, and estimating a relationship between a first coordinate system relative to the at least one coupling portion and a second coordinate system relative to the force sensor, based at least on the first measurement value, the second measurement value, and the third measurement value to calculate a magnitude of an external force acting on the specified object.

In accordance with another example aspect of the disclosure, a computer-readable storage medium may store instructions executable by a processor, wherein the instructions, when executed, cause the processor of an electronic device to: receive a first measurement value of a force sensor due to a weight of a specified object with respect to a first position of at least one coupling portion coupled to the force sensor to which the specified object is attached, receive a second measurement value of the force sensor due to the weight of the specified object with respect to a second position of the at least one coupling portion, receive a third measurement value of the force sensor due to the weight of the specified object with respect to a third position of the at least one coupling portion, and estimate a relationship between a first coordinate system relative to the at least one coupling portion and a second coordinate system relative to the force sensor, based at least on the first measurement value, the second measurement value, and the third measurement value to calculate a magnitude of an external force acting on the specified object.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following detailed description, taken in conjunction with the accompanying drawings, in which.

With regard to description of drawings, similar or same components may be marked by similar or same reference numerals.

DETAILED DESCRIPTION

Figure 1:
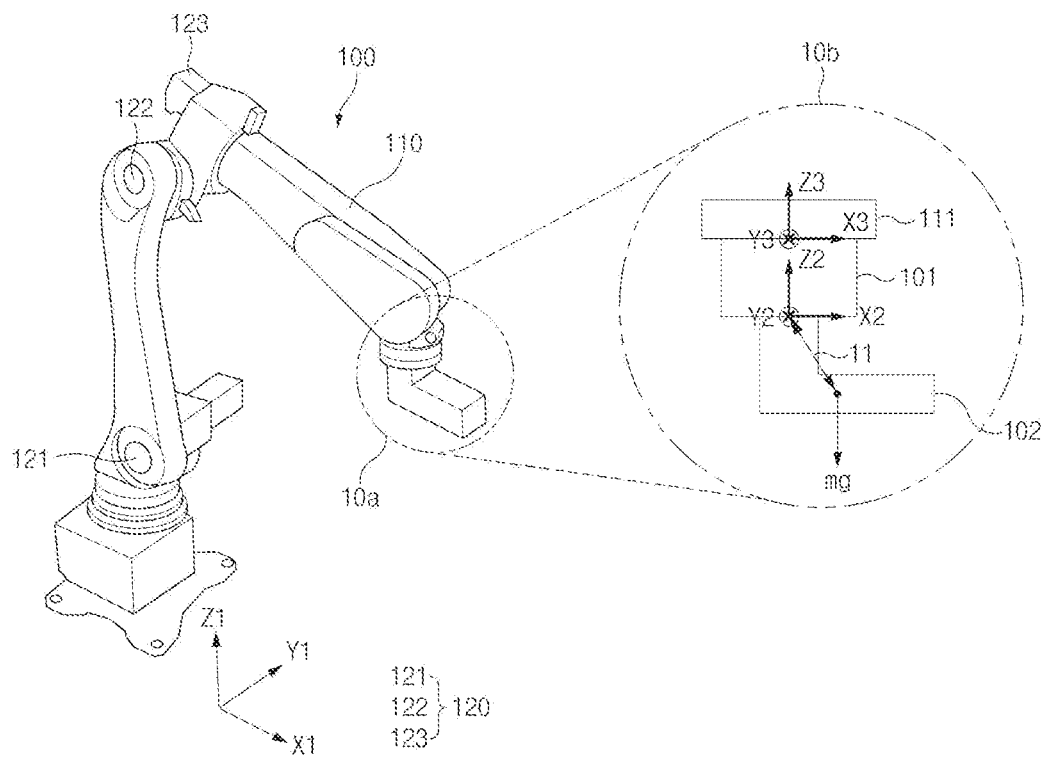
FIG. 1 is a diagram illustrating a perspective view and a partial enlarged view of an example electronic device to which a force sensor is connected, according to an embodiment.

FIG. 1 is a diagram illustrating a perspective view and a partial enlarged view of an example electronic device to which a force sensor is connected, according to an embodiment.

Referring to FIG. 1, an electronic device 100 may include a robot arm 110 and an actuator 120 that controls the robot arm 110. According to various embodiments, the electronic device 100 is not limited to that illustrated in FIG. 1. For example, the shape of the robot arm 110 included in the electronic device 100 or the number, position, or the like of the actuator 120 may differ from those shown in FIG. 1. According to an embodiment, a partial enlarged view 10b illustrates an enlarged portion of the electronic device 100, for example, a first portion 10a including a coupling portion 111 to which a force sensor 101 is attached, and a side view thereof is illustrated. In the description of FIG. 1, it may be understood that the side view is a view of the first portion 10a viewed in the direction of a Y1 axis.

According to an embodiment, the robot arm 110 may include a plurality of joints and may be moved by the actuator 120 disposed in each of the plurality of joints. For example, the robot arm 110 may be moved such that a position of one end of the robot arm 110, for example, a position at which the coupling portion 111 is disposed, is changed based on operation of the actuator 120. According to an embodiment, the robot arm 110 may be moved based on external force acting on at least a portion of the robot arm 110, regardless of the control of the actuator 120. For example, an external force may be applied to the force sensor 101 or a specified object, which is directly or indirectly coupled to at least a portion of the robot arm 110, and the robot arm 110 may be moved such that the position of one end of the robot arm 110, for example, the position at which the coupling portion 111 is disposed is changed. In the disclosure, the external force may be understood to include forces and/or torques.

According to an embodiment, at least one or more actuators 120 may be provided. For example, the actuators 120 may include a first actuator 121, a second actuator 122, and/or a third actuator 123. In various embodiments, the actuator 120 may rotate at least a portion of the robot arm 110 by a specified angle and change the position of one end of the robot arm 110, for example, the position at which the coupling portion 111 is disposed to a specified position.

Referring to the partial enlarged view (10b), the coupling portion 111 may be disposed at one end of the robot arm 110. In various embodiments, at least one or more coupling portions 111 may be provided. For example, the coupling portion 111 may be disposed at one end of the robot arm 110 toward at least one direction. For example, the coupling portion 111 may be disposed toward a first direction (e.g., –Z1 direction) from the robot arm 110 as illustrated in FIG. 1, and may be disposed toward the first direction (e.g., –Z1 direction) and/or a second direction (e.g., X1 direction) from the robot arm 110, unlike those illustrated in FIG. 1.

According to an embodiment, the coupling portion 111 may be coupled to the force sensor 101. According to an embodiment, the force sensor 101 may be detachable from or attachable to the coupling portion 111. For example, when the electronic device 100 performs an operation requiring no measurement of external force, the force sensor 101 may be detached from the coupling portion 111, and when the electronic device 100 may perform an operation requiring measurement of external force, the force sensor 101 may be attached to the coupling portion 111.

In various embodiments, the force sensor 101 may sense forces and/or torques. For example, the force sensor 101 may sense a strength or a direction of a force acting on a specified position of the force sensor 101, and may sense a torque acting at the specified position by a force acting on a position spaced apart from the specified position by a specified distance.

According to an embodiment, the force sensor 101 may be attached to a specified object 102. In the disclosure, the specified object 102 may, for example, be referred to as a "tool 102". In an embodiment, the tool 102 may be indirectly coupled to one end of the electronic device 100 via the force sensor 101 for various operations of the electronic device 100. According to various embodiments, the tool 102 may include an object suitable for operation which the electronic device 100 performs. For example, and without limitation, the tool 102 may include a gripper for performing a motion of picking up an object, and may include a torch or the like for performing welding. As another non-limiting example, the tool 102 may include a spray or the like for performing painting.

According to an embodiment, the tool 102 may be subjected to gravity. For example, a gravity mg corresponding to the mass "m" of the tool 102 may act on the tool 102 in the gravity direction. It may be understood that the gravity mg acts on the center of gravity of the tool 102. In an embodiment, the center of gravity may be spaced apart from the force sensor 101 by a first distance 11. Accordingly, the force sensor 101 may sense a force due to the gravity mg, but the strength or direction of the sensed force may be different from the gravity mg.

According to an embodiment, an external force may be applied to the tool 102. For example, the user may apply an external force to the tool 102 such that the electronic device 100 performs a specified operation with respect to a specified position to change the position of the tool 102 to a specified position. In an embodiment, the electronic device 100 may sense a force including a specified strength and direction using the force sensor 101 coupled to the tool 102. It is noted that the force sensed by the force sensor 101 may be different from the external force on the tool 102 in the strength and/or direction of the force because a working point thereof is different from that of the external force. For example, the external force on the tool 102 may be understood as acting on the center of gravity of the tool 102, and the force sensed by the force sensor 101 may be different from the external force because the center of gravity of the tool 102 is spaced apart from the force sensor 101 by the first distance 11. In an embodiment, the electronic device 100 may calculate the strength and/or direction of the external force on the tool 102 from a force sensed by the force sensor 101 using a specified equation.

According to an embodiment, the electronic device 100 may utilize a plurality of coordinate systems for measuring external forces. For example, the electronic device 100 may utilize a first coordinate system of X1, Y1, and Z1, a second coordinate system of X2, Y2, and Z2, and/or a third coordinate system of X3, Y3, and Z3.

In the disclosure, the first coordinate system may be a coordinate system relative to the electronic device 100, for example, the ground on which the electronic device 100 is located. In the disclosure, the second coordinate system may be a coordinate system relative to the force sensor 101. In an embodiment, when the force sensor 101 is moved according to the movement of the robot arm 110, the second coordinate system may also be moved. In the disclosure, the third coordinate system may be a coordinate system relative to the coupling portion 111. In an embodiment, the third coordinate system may also be moved when the coupling portion 111 is moved according to the movement of the robot arm 110.

Referring to the partial enlarged view 10b of FIG. 1, it may be understood that, in the second coordinate system and the third coordinate system, the axes thereof (for example, and without limitation, the X2 axis and the X3 axis or the Y2 axis and the Y3 axis) may be parallel to each other. However, according to various embodiments, the axes may not be parallel to each other depending on an assembly deviation that may be caused when the force sensor 101 is attached to the coupling portion 111. For example, the relationship between the second coordinate system and the third coordinate system may be changed each time the force sensor 101 is detached and attached.

According to an embodiment, the external force on the tool 102 may be calculated as a value obtained by subtracting a bias value of the force sensor 101 itself and the weight of the tool 102 from an external force measured by the force sensor 101. The external force on the tool 102 may be expressed as follows:

$$\begin{bmatrix} {}^s\hat{F} \\ {}^s\hat{T} \end{bmatrix} = \begin{bmatrix} {}^sF \\ {}^sT \end{bmatrix} - \begin{bmatrix} {}^sF_0 \\ {}^sT_0 \end{bmatrix} - \begin{bmatrix} {}^sR_R{}^RF_g \\ {}^sr_{CG} \times ({}^sR_R{}^RF_g) \end{bmatrix}$$

In an embodiment, $$\begin{bmatrix} {}^s\hat{F} \\ {}^s\hat{T} \end{bmatrix}$$

represents a calculated external force on the tool 102, that is, a force and a torque based on the second coordinate system relative to the force sensor 101. In an example embodiment, $$\begin{bmatrix} {}^sF \\ {}^sT \end{bmatrix}$$

represents the force and torque measured by the force sensor 101 based on the second coordinate system. In an example embodiment, $$\begin{bmatrix} {}^sF_0 \\ {}^sT_0 \end{bmatrix}$$

represents the bias value of the force sensor 101 itself based on the second coordinate system. For example, the bias value may be understood as a value for adjusting the zero point of the force sensor 101 itself. In an example embodiment, $$\begin{bmatrix} {}^sR_R{}^RF_g \\ {}^sr_{CG} \times ({}^sR_R{}^RF_g) \end{bmatrix}$$

represents the force and torque acting on the force sensor 101 due to the gravity of the tool 102, based on the second coordinate system.

In an example embodiment, ${}^RF_g$ may be understood as the gravity of the tool 102 based on a first coordinate system relative to the electronic device 100 or the ground on which the electronic device 100 or is disposed. For example, ${}^RF_g$ may have a value of mg in the −Z1 axis direction on the first coordinate system, and thus, may be expressed by $${}^RF_g = \begin{bmatrix} 0 \\ 0 \\ -mg \end{bmatrix}.$$

In an example embodiment, ${}^sR_R$ may be understood as a relationship for transforming the first coordinate system to the second coordinate system, and $^sr_{CG}$ may be understood as a distance to the center of gravity of the tool 102 from the force sensor 101, for example, the first distance 11.

According to an embodiment, the relationship $^sR_R$ for transforming the first coordinate system to the second coordinate system may be expressed by $^sR_f {}^fR_R$ using a relationship $^sR_f$ for transforming the first coordinate system to the third coordinate system, and a relationship $^fR_R$ for transforming the third coordinate system to the second coordinate system. According to an example embodiment, the electronic device 100 may obtain $^sR_f$ through the position information of the coupling portion 111. According to an embodiment, the electronic device 100 may estimate $^sR_f$ taking into account an assembly error between the coupling portion 111 and the force sensor 101.

According to an embodiment, the electronic device 100 may obtain a value $$\begin{bmatrix} ^sF \\ ^sT \end{bmatrix}$$

measured via the force sensor 101 from the force sensor 101. In an embodiment, when the electronic device 100 estimates the bias value $$\begin{bmatrix} ^sF_0 \\ ^sT_0 \end{bmatrix}$$

of the force sensor 101, the gravity $^RF_g$ of the tool 102 on the first coordinate system, the relationship $^sR_R$ between the first coordinate system and the second coordinate system, and the first distance $^sr_{CG}$, the electronic device 100 may calculate the external force $$\begin{bmatrix} ^s\hat{F} \\ ^s\hat{T} \end{bmatrix}$$

applied to the tool 102 through the above equation.

Hereinafter, there are described various example methods of calculating at least one offset parameter for calculating an external force applied to the tool 102, for example, a bias value of the force sensor 101, a gravity of the tool 102, a relationship between a first coordinate system and a second coordinate system, and/or the first distance 11 and a method of calculating an external force applied to the tool 102 using the offset parameter. In the disclosure, the description given with reference to FIG. 1 may be applied to configurations indicated by the same reference numerals as those shown in FIG. 1.

Figure 2:
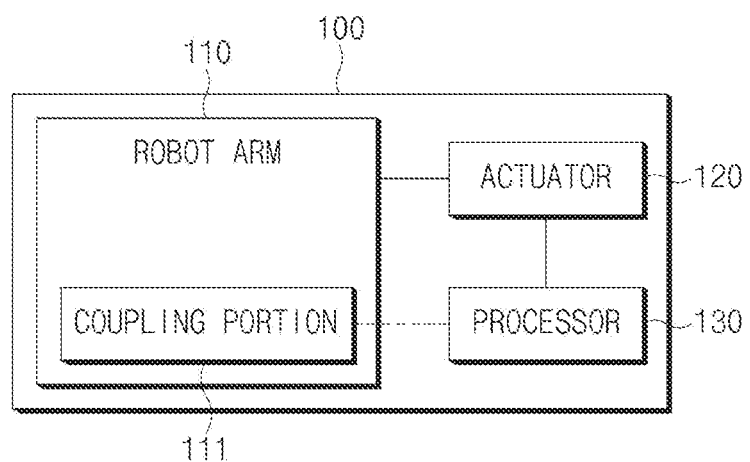
FIG. 2 is a block diagram illustrating an example electronic device, according to an embodiment.

FIG. 2 is a block diagram illustrating an example electronic device, according to an embodiment;

Referring to FIG. 2, the electronic device 100 may include the robot arm 110, the actuator 120, and a processor (e.g., including processing circuitry) 130. According to various embodiments, the electronic device 100 may further include a configuration which is not illustrated in FIG. 2, or may omit some of the configurations illustrated in FIG. 2. For example, the electronic device 100 may further include a memory electrically coupled to the processor 130.

According to an example embodiment, the robot arm 110 may include the coupling portion 111. In an example embodiment, the coupling portion 111 may be electrically and/or physically coupled to a force sensor (e.g., the force sensor 101 of FIG. 1). The coupling portion 111 may, for example, be indirectly coupled to a tool (e.g., the tool 102 of FIG. 1) coupled to the force sensor through the force sensor. In another embodiment, the coupling portion 111 may be directly coupled to the tool without a force sensor.

According to an embodiment, the robot arm 110 may be electrically coupled to the actuator 120 and may move the coupling portion 111 to a specified position based on the control of the actuator 120. According to an embodiment, the robot arm 110 may move the coupling portion 111 to a specified position based on an external force. For example, the user may apply an external force to the robot arm 110 or a force sensor or a tool coupled to the robot arm 110 through the coupling portion 111, and the robot arm 110 may move a position of the coupling portion 111 based on the external force.

According to an embodiment, at least one or more actuators 120 may be provided. In an example embodiment, the actuator 120 may drive the robot arm 110 under control of the processor 130. For example, the actuator 120 may receive coordinate information for the specified position from the processor 130, and drive the robot arm 110 such that the coupling portion 111 is moved to a position corresponding to the coordinate information based on the received information.

According to an embodiment, the processor 130 may include various processing circuitry and be electrically coupled to components included in the electronic device 100 and may receive specified information from the components and perform operations based on the received information. In an example embodiment, the processor 130 may control the components based on the performed operations. For example, the processor 130 may receive information about the external force from the force sensor through the coupling portion 111. The processor 130 may perform an operation based on the received information and calculate a strength or direction of the external force. The processor 130 may control the actuator 120 such that the robot arm 110 moves according to the external force when the external force is equal to or higher than a specified level.

According to an embodiment, the electronic device 100 may further include a memory. The memory may store instructions for operations to be performed by the processor 130 and may store information received by the processor 130 or results obtained by computations by the processor 130.

In the disclosure, the description given with reference to FIG. 2 may be referred to with respect to configurations indicated by the same reference numerals as those of the electronic device 100 illustrated in FIG. 2.

Figure 3:
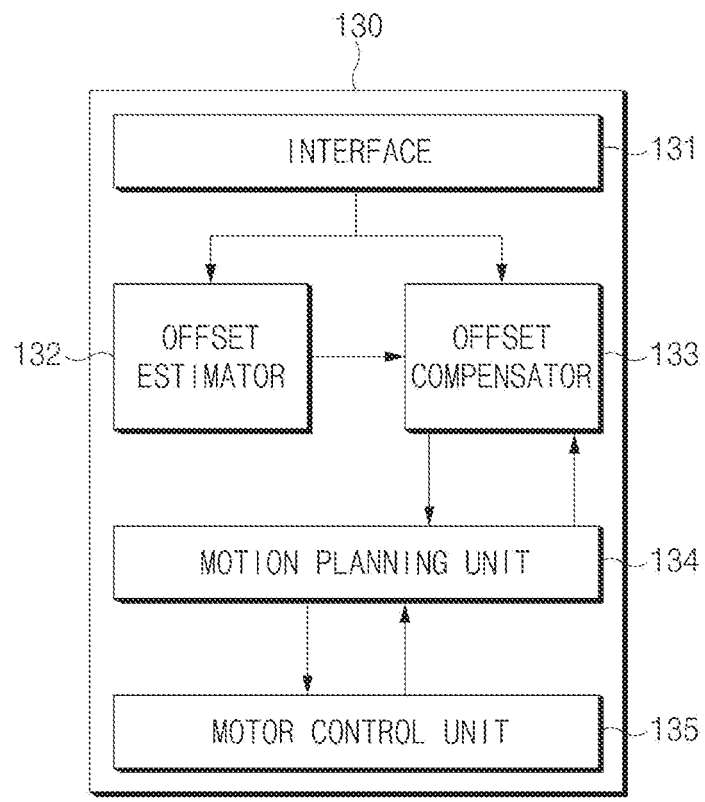
FIG. 3 is a block diagram illustrating an example processor according to an embodiment.

FIG. 3 is a block diagram illustrating an example processor according to an embodiment.

Referring to FIG. 3, the processor 130 may include an interface (e.g., including interface circuitry) 131, an offset estimator (e.g., including processing circuitry and/or executable program elements) 132, an offset compensator (e.g., including processing circuitry and/or executable program elements) 133, a motion planning unit (e.g., including processing circuitry and/or executable program elements)134, and a motor control unit (e.g., including processing circuitry and/or executable program elements) 135. According to various embodiments, the processor 130 may further include a configuration not illustrated in FIG. 3, and may omit some of the configurations illustrated in FIG. 3. In an example embodiment, at least some of the configurations illustrated in FIG. 3 may be merged into one configuration. According to various embodiments, the configurations of processor 130 illustrated in FIG. 3 may be implemented in hardware and/or software.

According to an embodiment, the interface 131 may include various interface circuitry, such as, for example, and without limitation, an input/output terminal for being electrically connected to a force sensor (e.g., the force sensor 101 of FIG. 1). In various embodiments, the interface 131 may include, for example, and without limitation, a general purpose input output (GPIO), a mobile industry processor interface (MIPI), or the like. According to an embodiment, the processor 130 may obtain a value of the force or torque sensed by the force sensor from results of measurement by the force sensor via the interface 131. For example, the interface 131 may obtain the value of the force or torque, for example, $$\begin{bmatrix} {}^sF \\ {}^sT \end{bmatrix}$$

through signal processing for a measurement value received from the force sensor. The signal processing may include, for example, an operation of converting, for example, by the interface 131, the measurement value to a digital value using, for example, an analog digital converter (ADC) and/or an operation of removing, by the interface 131, noise from the measurement value.

According to an embodiment, the offset estimator 132 may include various processing circuitry and/or executable program elements that calculate at least one parameter for calculating the external force applied to the tool, using the force or torque sensed by the force sensor, which is obtained via the interface 131. The at least one parameter may include, for example, and without limitation, a bias value of the force sensor 101, a gravity (or a mass) of the tool (e.g., the tool 102 of FIG. 1), a relationship between the first and second coordinate systems, and/or a distance to the center of gravity of the tool (e.g., the first distance 11 in FIG. 1). In an example embodiment, the calculated at least one parameter may be transferred to the offset compensator.

According to an embodiment, the offset compensator 133 may include various processing circuitry and/or executable program elements and calculate the external force acting on the tool, for example, $$\begin{bmatrix} {}^s\hat{F} \\ {}^s\hat{T} \end{bmatrix}$$

using the force or torque sensed by the force sensor, which is obtained via the interface 131, and the at least one parameter received from the offset estimator 132. According to an embodiment, the offset compensator 133 may calculate the external force acting on the tool periodically according to a specified time interval.

According to an embodiment, the offset compensator 133 may transfer the calculated external force, for example, $$\begin{bmatrix} {}^s\hat{F} \\ {}^s\hat{T} \end{bmatrix}$$

to the motion planning unit 134. According to an embodiment, the offset compensator 133 may obtain position information of the coupling portion (e.g., the coupling portion 111 in FIG. 1) from the motion planning unit 134. Thus, the processor 130 may obtain a relationship between a first coordinate system with respect to an electronic device (e.g., the electronic device 100 of FIG. 1) and a third coordinate system with respect to the coupling portion.

According to an embodiment, the motion planning unit 134 may include various processing circuitry and/or executable program elements that plan a motion of a robot arm (e.g., the robot arm 110 in FIG. 1) based on the external force acting on a tool, for example, $$\begin{bmatrix} {}^s\hat{F} \\ {}^s\hat{T} \end{bmatrix}$$

which is received from offset compensator 133. For example, the motion planning unit 134 may determine whether the received external force is equal to or higher than a specified level. In an example embodiment, when the received external force is equal to or greater than the specified level, the motion planning unit 134 may transmit a specified signal to the motor control unit 135 such that the robot arm is controlled based on the external force. In another embodiment, when the received external force is less than the specified level, the motion planning unit 134 may transmit a specified signal to the motor control unit 135 such that the robot arm is not controlled based on the external force. According to an embodiment, the motion planning unit 134 may obtain position information of the coupling portion from the motor control unit 135.

According to an embodiment, the motor control unit 135 may include various processing circuitry and/or executable program elements that control an actuator (e.g., the actuator 120 of FIG. 1) based on the specified signal received from the motion planning unit 134. For example, when receiving a signal to control the robot arm based on the external force from the motion planning unit 134, the motor control unit 135 may drive the actuator so as to operate in accordance with the external force. In another example, when receiving a signal not to control the robot arm based on the external force from the motion planning unit 134, the motor control unit 135 may drive the actuator so as not to operate in accordance with the external force. According to an embodiment, the motor control unit 135 may obtain position information of the coupling portion from the actuator.

Figure 4:
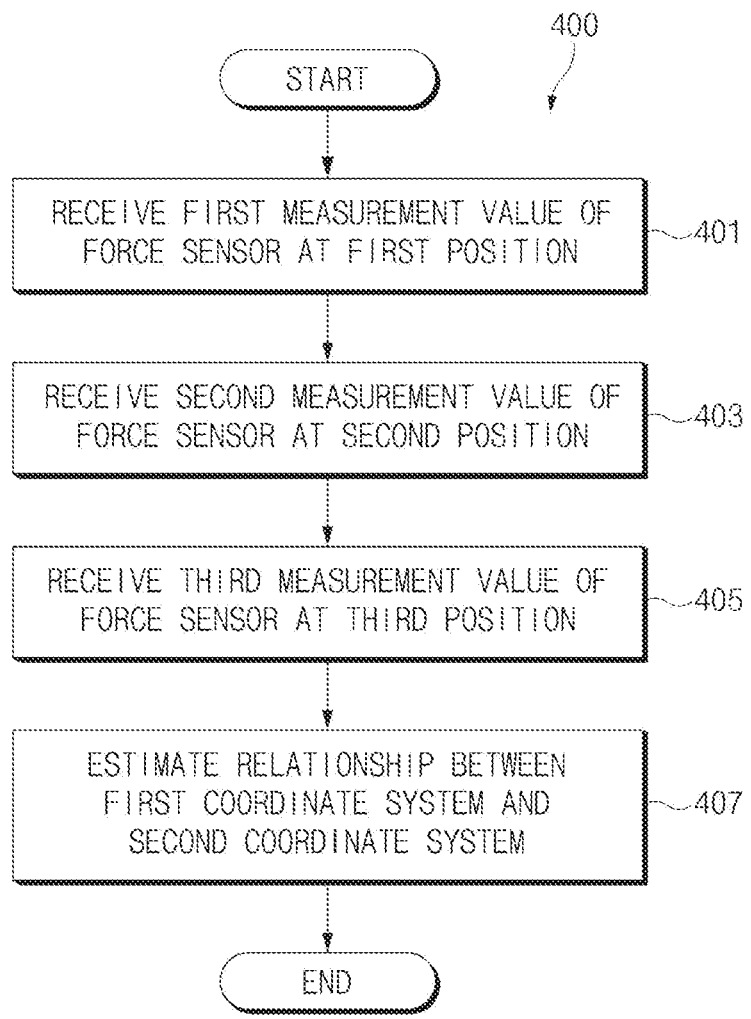
FIG. 4 is a flowchart illustrating an example method of estimating a relationship between a first coordinate system and a second coordinate system in an electronic device according to an embodiment.

FIG. 4 is a flowchart illustrating an example method of estimating a relationship between a first coordinate system and a second coordinate system in an electronic device according to an embodiment.

Referring to FIG. 4, a method 400 of estimating a relationship between a first coordinate system and a second coordinate system in an electronic device may include, for example, and without limitation, operations 401, 403, 405 and 407 (which may be referred to hereinafter as "operations 401 to 407"). According to various embodiments, the operations 401 to 407 may be understood to be performed by the electronic device 100 and/or the processor 130 illustrated in FIG. 2.

In operation 401, the electronic device may receive a first measurement value of a force sensor, for example, a first force, a first torque, or the like, in a case where the position of a coupling portion from the force position sensor is a first position. In this case, the external force may not have been acted on the electronic device, the force sensor or a tool. In this case, a first equation for the first force may be expressed as follows.

$$^s\hat{F}^{(1)} = {}^sF^{(1)} - {}^sF_0 - {}^sR_R^{(1)R}F_g = {}^sF^{(1)} - {}^sF_0 - {}^sR_f{}^fR_R^{(1)R}F_g$$

In an example embodiment, $^s\hat{F}^{(1)}$ represents the calculated first force on the tool based on the second coordinate system relative to the force sensor. In an example embodiment, $^sF^{(1)}$ represents the first force measured by the force sensor based on the second coordinate system. In an example embodiment, $^sR_R^{(1)R}F_g$ represents a force acting on the force sensor due to the gravity of the tool based on the second coordinate system. In an example embodiment, $^sR_R^{(1)}$ represents a relationship between the first coordinate system relative to the electronic device and the second coordinate system and may be expressed by a product of a relationship ($^sR_f$) between the third coordinate system relative to the coupling portion and the first coordinate system and a relationship ($^fR_R^{(1)}$) between the third coordinate system and the second coordinate system, for example, $^sR_f{}^fR_R^{(1)}$.

In operation 403, the electronic device may receive a second measurement value of the force sensor, e.g., a second force, a second torque, or the like, in a case where the position of the coupling portion from the force sensor is a second position. In this case, the external force may not have been acted on the electronic device, the force sensor or a tool. In addition, a second equation for the second force may be expressed as follows.

$$^s\hat{F}^{(2)} = {}^sF^{(2)} - {}^sF_0 - {}^sR_R^{(2)R}F_g = {}^sF^{(2)} - {}^sF_0 - {}^sR_f{}^fR_R^{(2)R}F_g$$

In an example embodiment, $^s\hat{F}^{(2)}$ represents the calculated second force on the tool based on the second coordinate system. In an example embodiment, $^sF^{(2)}$ represents the second force measured by the force sensor based on the second coordinate system. In an example embodiment, $^sR_R^{(2)R}F_g$ represents a force acting on the force sensor due to the gravity of the tool based on the second coordinate system. In an example embodiment, $^sR_R^{(2)}$ may represent a relationship between the first coordinate system and the second coordinate system and may be expressed by, for example, $^sR_f{}^fR_R^{(2)}$ using the third coordinate system.

In operation 405, the electronic device may receive a third measurement value of a force sensor, for example, a third force, a third torque, or the like, in a case where the position of a coupling portion from the force sensor is a third position. In this case, the external force may not have been acted on the electronic device, the force sensor or a tool. In addition, a third equation for the third force may be expressed as follows.

$$^s\hat{F}^{(3)} = {}^sF^{(3)} - {}^sF_0 - {}^sR_R^{(3)R}F_g = {}^sF^{(3)} - {}^sF_0 - {}^sR_f{}^fR_R^{(3)R}F_g$$

In an example embodiment, $^s\hat{F}^{(3)}$ represents the calculated third force on the tool based on the second coordinate system. In an example embodiment, $^sF^{(3)}$ represents the third force measured by the force sensor based on the second coordinate system. In an example embodiment, $^sR_R^{(3)R}F_g$ represents a force acting on the force sensor due to the gravity of the tool based on the second coordinate system. In an example embodiment, $^sR_R^{(3)}$ may represent a relationship between the first coordinate system and the second coordinate system and may be expressed by, for example, $^sR_f{}^fR_R^{(3)}$ using the third coordinate system.

In operation 407, the electronic device may estimate the relationship between the first coordinate system and the second coordinate system using the first equation to the third equation obtained in operations 401, 403 and 405.

According to an embodiment, the electronic device may subtract one of the first to third equations from another of the first to third equations. For example, the second equation may be subtracted from the first equation, the third equation may be subtracted from the first equation, and the third equation may be subtracted from the second equation. Accordingly, a common part of the first equation to the third equation, for example, the bias value $^sF_0$ of the force sensor may be eliminated, and $^s\hat{F}^{(1)}$, $^s\hat{F}^{(2)}$, and $^s\hat{F}^{(3)}$ may be zero because there is no external force actually acting on the force sensor. Therefore, the equation obtained through operation 407 may be as follows.

$$^sF^{(i)} - {}^sF^{(j)} = {}^sR_f({}^fR_R^{(i)} - {}^fR_R^{(j)})^RF_g$$

In an example embodiment, i and j may be any different numbers of one to three. When $^s\Delta F^{(k)} := {}^sF^{(i)} - {}^sF^{(j)}$ and $^f\Delta R_R^{(k)} := {}^fR_R^{(i)} - {}^fR_R^{(j)}$ are applied to the above equation, the above equation may be re-expressed as follows.

$$^s\Delta F^{(k)} = {}^sR_f{}^f\Delta R_R^{(k)R}F_g$$

In an example embodiment, the maximum value of k may be the number of equations obtained as a result of subtracting one of the equations from another of the equations. For example, when the first equation and the third equation are used, $k = {}_3C_2 = 3$ may be resulted.

According to an embodiment, the electronic device may normalize both sides of the re-expressed equation and define the difference between both sides as an error. For example, the electronic device may define the error as follows.

$$err^{(k)} := {}^sR_f({}^f\Delta R_R^{(k)}[0\ 0 - 1]^T) - \frac{{}^s\Delta F^{(k)}}{\|{}^s\Delta F^{(k)}\|^2}$$

In an example embodiment, the electronic device may obtain $^sR_f$ such that the error is minimized and/or reduced. For example, the electronic device may obtain $^sR_f$ satisfying the following equation.

$$^sR_f = \operatorname*{argmin}_{{}^sR_f} \sum_{k=1}^{3} (err^{(k)})^2$$

According to an example embodiment, the electronic device may obtain the relationship between the first coordinate system and the second coordinate system using at least the obtained $^sR_f$. For example, the relationship between the first coordinate system and the second coordinate system, for example, a relationship $^sR_R$ for converting the first coordinate system to the second coordinate system may be calculated from $^sR_f{}^fR_R$. In an example embodiment, the electronic device may be able to obtain $^sR_f$ through operation 407 and also $^fR_R$ through the position information of the coupling portion. The electronic device may obtain the relationship between the first coordinate system and the second coordinate system, for example, $^sR_R$ using the obtained $^sR_f$ and $^fR_R$.

Through operations 401 to 407, the electronic device may obtain the relationship between the first coordinate system and the second coordinate system considering an assembly error between the coupling portion and the force sensor, for example, $^sR_R$. Thus, the electronic device may more accurately calculate at least one parameter for measuring the external force.

According to various embodiments, the method 400 of estimating the relationship between the first coordinate system and the second coordinate system in the electronic device illustrated in FIG. 4 may further include an operation not illustrated in FIG. 4. For example, the electronic device may further perform an operation of receiving a fourth measurement value of the force sensor at a fourth position before performing the operation 407 after the operation 405 is performed. In this case, in the operation 407, i and j may be any different numbers of 1 to 4, and $k={_4}C_2=6$ may be resulted.

Figure 5A:
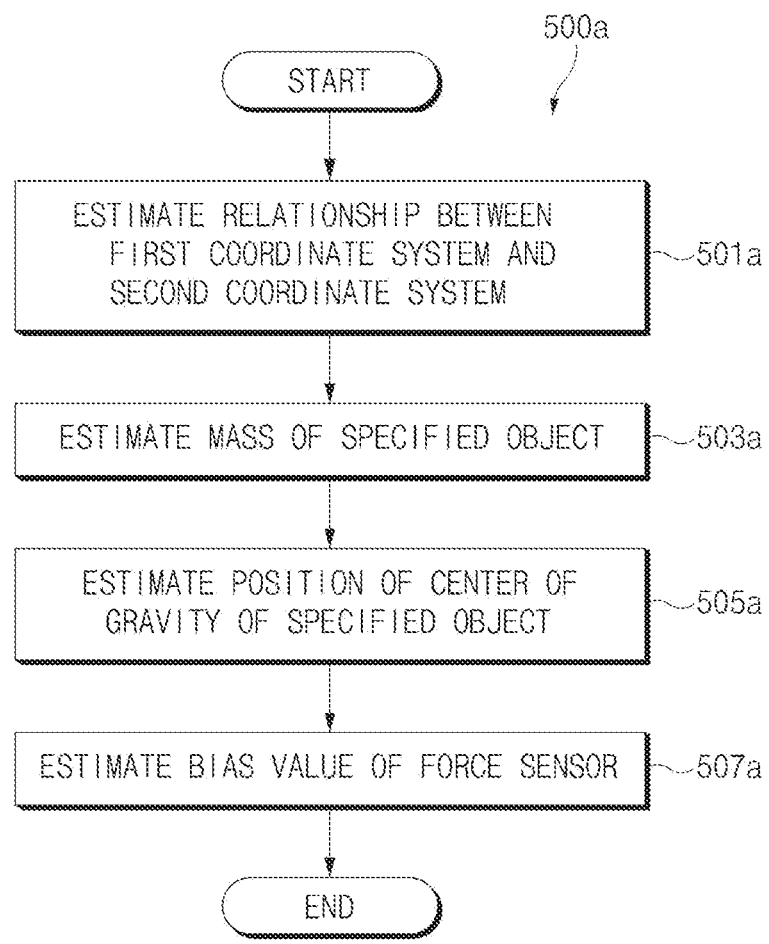
FIG. 5A is a flowchart illustrating an example method of measuring an external force in an electronic device, according to an embodiment.

FIG. 5A is a flowchart illustrating an example method of measuring an external force in an electronic device, according to an embodiment.

Referring to FIG. 5A, the electronic device may obtain offset parameters for measuring an external force using the relationship between the first coordinate system and the second coordinate system obtained as in FIG. 4, for example, $^sR_R$. The electronic device may measure the external force using the obtained offset parameters. A method 500a for the electronic device to measure the external force may include operations 501a, 503a, 505a and 507a (which may be referred to hereinafter as "501a through 507a"). According to various embodiments, operations 501a to 507a may be understood to be performed by the electronic device 100 and/or the processor 130 illustrated in FIG. 2. In the description given with reference to FIG. 5A, parts overlapping with the description given with reference to FIG. 4 may not be repeated.

In operation 501a, the electronic device may estimate a relationship between the first coordinate system and the second coordinate system. According to an embodiment, the relationship, for example, a relationship $^sR_R$ for transforming the first coordinate system to the second coordinate system may be obtained through the method 400 illustrated in FIG. 4.

In operation 503a, the electronic device may estimate the mass of a specified object, for example, a tool (e.g., the tool 102 of FIG. 1) attached to the force sensor (e.g., the force sensor 101 of FIG. 1) using $^sR_R$ obtained in operation 501a. For example, the electronic device may obtain the following equation in operation 407 of FIG. 4.

$$^sF^{(i)} - {}^sF^{(j)} = {}^sR_f({}^fR_R^{(i)} - {}^fR_R^{(j)}){}^RF_g$$

In an example embodiment, $^sF^{(i)} - {}^sF^{(j)}$ may be a measured value, $^sR_f$ is a value obtained in operation 501a, and $^fR_R^{(i)} - {}^fR_R^{(j)}$ may be a value obtainable through the position information of the coupling portion. In an example embodiment, the electronic device may be able to obtain remaining values except $^RF_g$ that is the gravity of the tool, and therefore may calculate the mass of the tool.

In operation 505a, the electronic device may estimate a position of the center of gravity of the tool using $^sR_R$ obtained in operation 501a and the mass "m" of the tool obtained in operation 503a. According to an embodiment, the electronic device may receive three or more measurement values at three or more positions from the force sensor, as in operations 401 to 407 illustrated in FIG. 4. In an example embodiment, the measurement values may include a torque value measured by the force sensor. In various embodiments, equations for the torque value may be expressed as:

$$^s\hat{T}^{(1)} = {}^sT^{(1)} - {}^sT_0 - {}^sr_{CG} \times ({}^sR_R^{(1)R}F_g) = {}^sT^{(1)} - {}^sT_0 - {}^sr_{CG} \times ({}^sR_f {}^fR_R^{(1)R}F_g)$$

$$^s\hat{T}^{(2)} = {}^sT^{(2)s}T_0 - {}^sr_{CG} \times ({}^sR_R^{(2)R}F_g) = {}^sT^{(2)} - {}^sT_0 - {}^sr_{CG} \times ({}^sR_f {}^fR_R^{(2)R}F_g)$$

$$^s\hat{T}^{(3)} = {}^sT^{(3)s}T_0 - {}^sr_{CG} \times ({}^sR_R^{(3)R}F_g) = {}^sT^{(3)} - {}^sT_0 - {}^sr_{CG} \times ({}^sR_f {}^fR_R^{(3)R}F_g)$$

According to an embodiment, the electronic device may subtract one of the equations from another of the equations. Also, in various embodiments, when the external force is zero, and $^s\hat{T}^{(1)}$, $^s\hat{T}^{(2)}$, and $^s\hat{T}^{(3)}$ may be zero, which may be expressed by the following equation:

$$^sT^{(i)} - {}^sT^{(j)} = {}^sr_{CG} \times ({}^sR_f ({}^fR_R^{(j)} - {}^fR_R^{(i)}){}^RF_g)$$

According to an example embodiment, the above equation may be expressed using $^s\Delta T^{(k)} := {}^sT^{(i)} - {}^sT^{(j)}$ and $^f\Delta R_R^{(k)} := {}^fR_R^{(i)} - {}^fR_R^{(j)}$ as follows:

According to an embodiment, the electronic device may have obtained the remaining parameters except $^sr_{CG}$ in the above equation. For example, the electronic device may obtain $^s\Delta T^{(k)}$ from the measurement value of the force sensor, obtain $^sR_R$ and $^sR_f$ through operation 501a, obtain $^f\Delta R_R^{(k)}$ through the coupling portion (e.g., the position information of the coupling portion 111 in FIG. 2), and obtain $^RF_g$ through operation 503a described above. Thus, the electronic device may obtain the position of the center of gravity of the tool $^sr_{CG}$ using the parameters. For example, the error may be defined as follows and $^sr_{CG}$ for minimizing and/or reducing the error may be obtained.

$$err^{(k)} := {}^sr_{CG} \times P^{(k)} - {}^s\Delta T^{(k)}$$

$$^sr_{CG} = \underset{{}^sr_{CG}}{\operatorname{argmin}} \sum_{k=1}^{3} (err^{(k)})^2$$

In operation 507a, the electronic device may estimate a bias value of the force sensor. For example, an electronic device may receive three or more measurement values at three or more positions from the force sensor, as in operations 401 to 407 illustrated in FIG. 4. In various embodiments, an equation using an i-th measurement value may be as follows;

$$\begin{bmatrix} {}^s\hat{F}^{(i)} \\ {}^s\hat{T}^{(i)} \end{bmatrix} = \begin{bmatrix} {}^sF^{(i)} \\ {}^sT^{(i)} \end{bmatrix} - \begin{bmatrix} {}^sF_0 \\ {}^sT_0 \end{bmatrix} - \begin{bmatrix} {}^sR_R^{(i)R}F_g \\ {}^sr_{CG} \times ({}^sR_R^{(i)R}F_g) \end{bmatrix}$$

According to various embodiments, the external force acting on the force sensor may always measured to be zero and thus, $^s\hat{F}^{(i)}$ and $^s\hat{T}^{(i)}$ may be zero. In an embodiment, the electronic device may have obtained the remaining parameters except $$\begin{bmatrix} {}^sF_0 \\ {}^sT_0 \end{bmatrix}$$

in the above equation. For example, the electronic device may obtain $$\begin{bmatrix} {}^sF^{(i)} \\ {}^sT^{(i)} \end{bmatrix}$$

from the measurement value of the force sensor, obtain ${}^sR_R{}^{(i)}$ through operation 501*a*, obtain ${}^RF_g$ through operation 503*a*, and obtain ${}^sr_{CG}$ through operation 505*a*. Thus, the electronic device may obtain the bias value of the force sensor of the tool $$\begin{bmatrix} {}^sF_0 \\ {}^sT_0 \end{bmatrix}$$

using the parameters as follows. In an example embodiment, N is the number of measurements and may be equal to or greater than three. For example, when the electronic device has attempted three measurements as in the method illustrated in FIG. 4, N may be three.

$$\begin{bmatrix} {}^sF_0 \\ {}^sT_0 \end{bmatrix} = \frac{1}{N} \sum_{i=1}^{N} \left( \begin{bmatrix} {}^sF^{(i)} \\ {}^sT^{(i)} \end{bmatrix} - \begin{bmatrix} {}^sR_R^{(i)R}F_g \\ {}^sr_{CG} \times ({}^sR_R^{(i)R}F_g) \end{bmatrix} \right)$$

According to operation 501*a* to the operation 507*a*, the electronic device may estimate and obtain the relationship between the coupling portion of the electronic device and the force sensor even though the relationship is not known in advance. Thus, the electronic device may obtain at least one parameter necessary for measurement of the external force and may more accurately measure the external force.

Figure 5B:
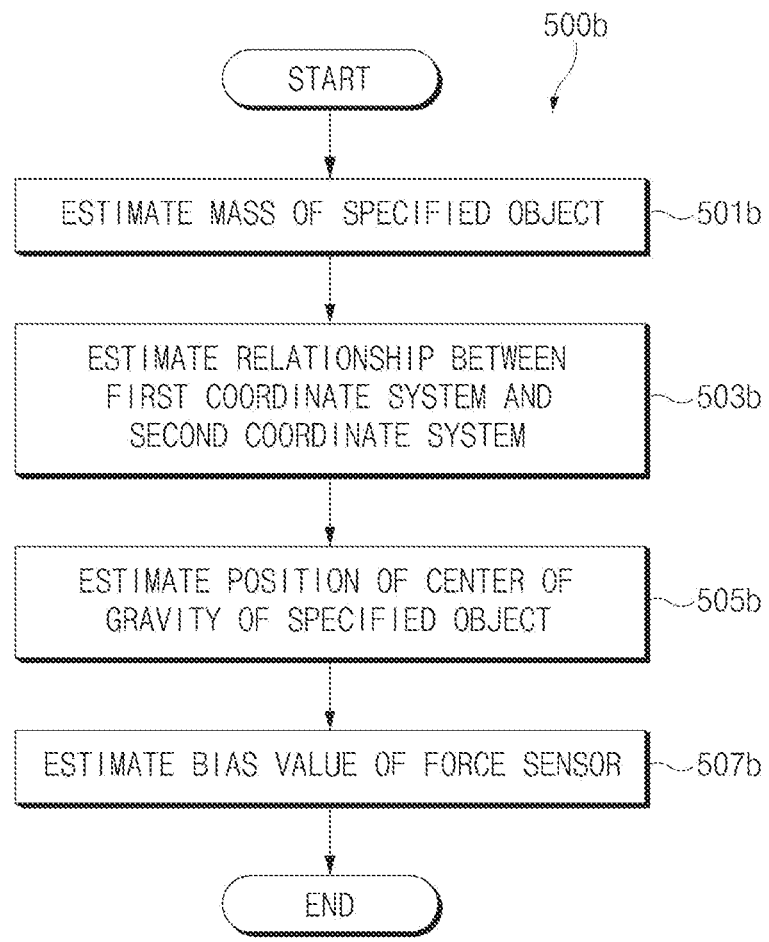
FIG. 5B is a flowchart illustrating an example method of measuring an external force in an electronic device, according to another embodiment.

FIG. 5B is a flowchart illustrating an example method for measuring an external force in an electronic device, according to another embodiment.

Referring to FIG. 5B, an electronic device may calculate a mass of a tool and measure an external force using a relationship between a first coordinate system and a second coordinate system obtained from the calculated mass of the tool, for example, ${}^sR_R$. The method 500*b* for the electronic device to measure the external force may include operations 501*b*, 503*b*, 505*b* and 507*b* (which may be referred to hereinafter as "501*b* through 507*b*"). According to various embodiments, operations 501*b* to 507*b* may be understood to be performed by the electronic device 100 and/or the processor 130 illustrated in FIG. 2. In the description of FIG. 5B, the description overlapping with the description of FIG. 5A may not be repeated. For example, the contents of operation 505*b* and operation 507*b* may be the same as or similar to those of operation 505*a* and operation 507*a*, respectively, and may not be included in the description of FIG. 5B.

In operation 501*b*, the electronic device may estimate the mass of a specified object, such as a tool (e.g., the tool 102 of FIG. 1) attached to a force sensor (e.g., the force sensor 101 of FIG. 1). According to an embodiment, the electronic device may, for example, and without limitation, receive three or more measurement values at three or more positions from the force sensor, as in operations 401 to 407 illustrated in FIG. 4. In an example embodiment, the measurement values may include a force measured by the force sensor. In various embodiments, the equations for the forces may be expressed as:

$${}^s\hat{f}^{(1)} = {}^sF^{(1)} - {}^sF_0 - {}^sR_R^{(1)R}F_g = {}^sF^{(1)} - {}^sF_0 - {}^sR_f{}^fR_R^{(1)R}F_g$$

$${}^s\hat{f}^{(2)} = {}^sF^{(2)} - {}^sF_0 - {}^sR_R^{(2)R}F_g = {}^sF^{(2)} - {}^sF_0 - {}^sR_f{}^fR_R^{(2)R}F_g$$

$${}^s\hat{f}^{(3)} = {}^sF^{(3)} - {}^sF_0 - {}^sR_R^{(3)R}F_g = {}^sF^{(3)} - {}^sF_0 - {}^sR_f{}^fR_R^{(3)R}F_g$$

According to an embodiment, the electronic device may subtract one of the equations from another of the equations. Also, in various embodiments, when the external force is zero, and ${}^s\hat{f}^{(1)}$, ${}^s\hat{f}^{(2)}$, and ${}^s\hat{f}^{(3)}$ may be zero, which may be expressed by the following equation:

$${}^sF^{(i)} - {}^sF^{(j)} = {}^sR_f({}^fR_R^{(i)} - {}^fR_R^{(j)})^RF_g$$

According to an embodiment, i and j may be any different numbers of 1 to 3. The above equation may be re-expressed using ${}^s\Delta F^{(k)} := {}^sF^{(i)} - {}^sF^{(j)}$ and ${}^f\Delta R_R^{(k)} := {}^fR_R^{(i)} - {}^fR_R^{(j)}$ as follows:

$${}^s\Delta F^{(k)} = {}^sR_f{}^f\Delta R_R^{(k)R}F_g$$

In an example embodiment, the maximum value of k may be the number of equations obtained as a result of subtracting one of the equations from another of the equations. For example, when the first equation and the third equation are used, $k = {}_3C_2 = 3$ may be resulted.

According to an embodiment, the re-expressed equation may be expressed as follows when inner-product is performed on both sides thereof by a transition matrix. In an embodiment, ${}^sR_f^T{}^sR_f$ is a normalized orthonormal relation and thus may be a unit matrix.

$${}^s\Delta F^{(k)T\,s}\Delta F^{(k)} = {}^RF_g^{Tf}\Delta R_R^{(k)T\,s}R_f^{T\,s}R_f{}^f\Delta R_R^{(k)R}F_g =$$
$${}^RF_g^{Tf}\Delta R_R^{(k)T\,f}\Delta R_R^{(k)R}F_g = m^{2R}V_g^{Tf}\Delta R_R^{(k)T\,f}\Delta R_R^{(k)R}V_g,$$
where $V_g := [0 \ 0 \ -g]^T$ According to an embodiment, the electronic device may define a difference between the both sides of the equation as an error and obtain $m^2$ such that the error is minimized and/or reduced. Through this, the electronic device may obtain the mass "m" of the tool.

$$err^{(k)} := m^{2R}V_g^{Tf}\Delta R_R^{(k)T\,f}\Delta R_R^{(k)R}V_g - {}^s\Delta F^{(k)T\,s}\Delta F^{(k)}$$

$$m^2 = \underset{m^2}{\operatorname{argmin}} \sum_{k=1}^{3} (err^{(k)})^2$$

In operation 503*b*, the electronic device may estimate a relationship between the first coordinate system and the second coordinate system. For example, the electronic device may obtain a relationship ${}^sR_R$ for transforming the first coordinate system to the second coordinate system using the mass "m" of the tool obtained in operation 501*b*.

According to an example embodiment, the electronic device may obtain a relationship ${}^sR_R$ using ${}^s\Delta F^{(k)} = {}^sR_f{}^f\Delta R_R^{(k)R}F_g$ of the equations obtained in operation 501*a*. For example, the electronic device may define the difference between the both sides in the above equation as the error and obtain ${}^sR_R$ such that the error is minimized and/or reduced.

$$err^{(k)} := {}^sR_f{}^f\Delta R_R^{(k)R}F_g - {}^s\Delta F^{(k)}$$

$${}^sR_f = \underset{{}^sR_f}{\operatorname{argmin}} \sum_{k=1}^{3} (err^{(k)})^2$$

In operation 505b, the electronic device may estimate a position of the center of gravity of the tool. For example, the electronic device may estimate the position of the center of gravity of the tool using $^sR_R$ obtained in operation 501b and the mass m of the tool obtained in operation 503b in the same or similar manner as operation 505a in FIG. 5A.

In operation 507b, the electronic device may estimate a bias value of the force sensor. For example, the electronic device may estimate the bias value of the force sensor using $^sR_R$ obtained in operation 501b, the mass m of the tool obtained in operation 503b, and the position $^sr_{CG}$ of the center of gravity of the tool obtained in operation 505b, in the same or similar manner as operation 505a in FIG. 5A.

According to operation 501a to operation 507a, the electronic device may estimate and obtain the relationship between the coupling portion of the electronic device (e.g., the coupling portion 111 in FIG. 2) and the force sensor even though the relationship is not known in advance. Thereby the electronic device may obtain at least one parameter necessary for measurement of the external force, and may more accurately measure the external force.

Figure 6:
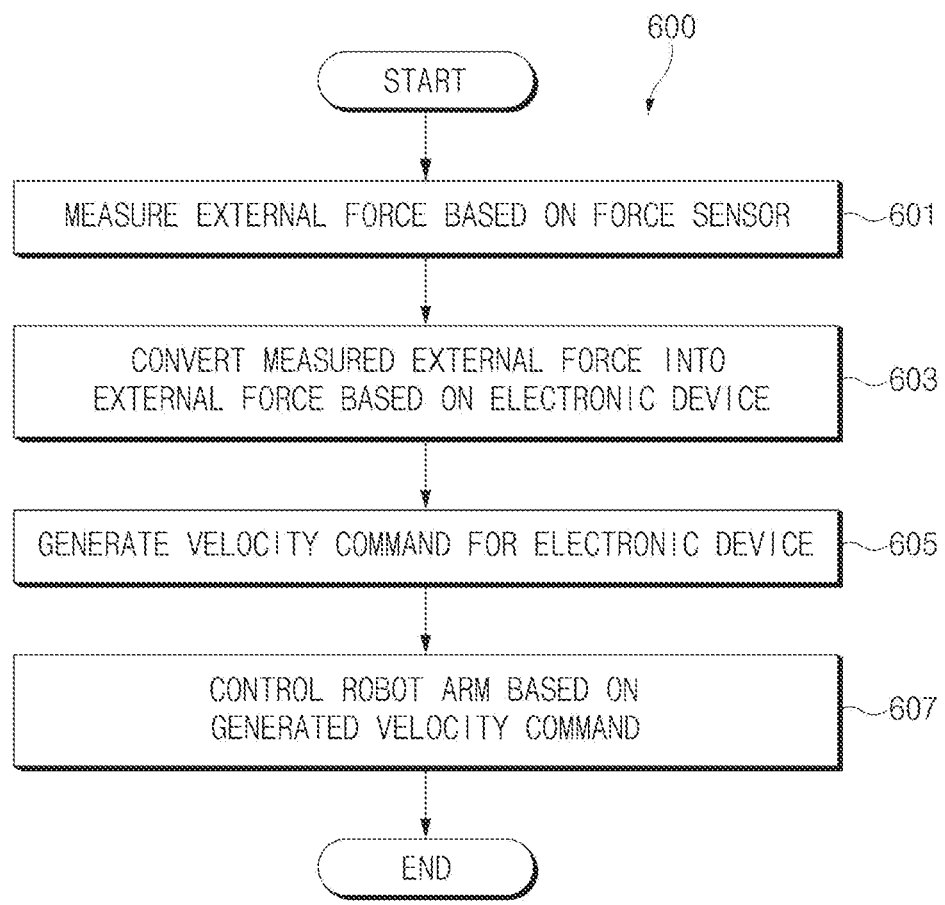
FIG. 6 is a flowchart illustrating an example method by which an electronic device operates based on a measured external force according to an embodiment.

FIG. 6 is a flowchart illustrating an example method by which an electronic device operates based on a measured external force according to an embodiment.

Referring to FIG. 6, a method 600 by which an electronic device operates based on measured external forces may include operations 601, 603, 605 and 607 (which may be referred to hereinafter as "601 through 607"). According to various embodiments, operations 601 to 607 may be understood to be performed by the electronic device 100 or the processor 130 illustrated in FIG. 2. In the description given with reference to FIG. 6, parts overlapping with the description of FIG. 4, FIG. 5A or FIG. 5B may not be repeated.

In operation 601, the electronic device may measure an external force, such as, for example, and without limitation, a force, a torque, or the like, based on a force sensor. For example, the electronic device may measure the external force acting on a tool on the basis of the second coordinate system with respect to the force sensor. For example, the electronic device may obtain offset parameters for measurement of the external force via the method 500a illustrated in FIG. 5A, the method 500b illustrated in FIG. 5B, or the like, and obtain a strength or direction of the external force based on the second coordinate system using the obtained offset parameters. According to an example embodiment, the obtained external force may be expressed by $^s\hat{F}$ or $^s\hat{T}$.

In operation 603, the electronic device may transform the external force measured in operation 601 into an external force based on the electronic device. For example, the electronic device may transform an external force measured based on the second coordinate system into an external force based on the first coordinate system relative to the electronic device. According to an embodiment, the transformed external force may be expressed as $^R\hat{F}$ or $^R\hat{T}$ According to an embodiment, the electronic device may transform the external force measured based on the second coordinate system into the external force based on the first coordinate system through the relationship $^fR_S$ for transforming the second coordinate system to the third coordinate system and the relationship $^RR_f$ for transforming the third coordinate system to the first coordinate system as follows:

$$^R\hat{F} = {^RR_f} {^fR_S} {^s\hat{F}}$$

$$^R\hat{T} = {^RR_f} {^fR_S} {^s\hat{T}}$$

In an example embodiment, the electronic device may obtain $^fR_S$ from $^sR_f$ obtained in operation 407 of FIG. 4 and obtain $^RR_f$ through the position information of the coupling portion.

In operation 605, the electronic device may generate a velocity command for the electronic device based on the external force transformed in operation 603. According to various embodiments, the velocity command may include at least one of a velocity ($^Rv$) or an angular velocity ($^Rw$) for the electronic device. The velocity command may be expressed as follows. In an example embodiment, $K_F$ or $K_T$ may represent a gain of a specified magnitude.

$$^Rv = K_F {^R\hat{F}}$$

$$^Rw = K_T {^R\hat{T}}$$

In operation 607, the electronic device may control the robot arm of the electronic device based on the velocity command generated in operation 605. For example, the electronic device may control a moving velocity of the robot arm using the obtained $^Rv$, and may control a moving angular velocity of the robot arm using the obtained $^Rw$.

Using operations 601 to 607, the electronic device may be dependent upon the external force and may control the robot arm based on the velocity or the angular velocity based on the external force.

Figure 7:
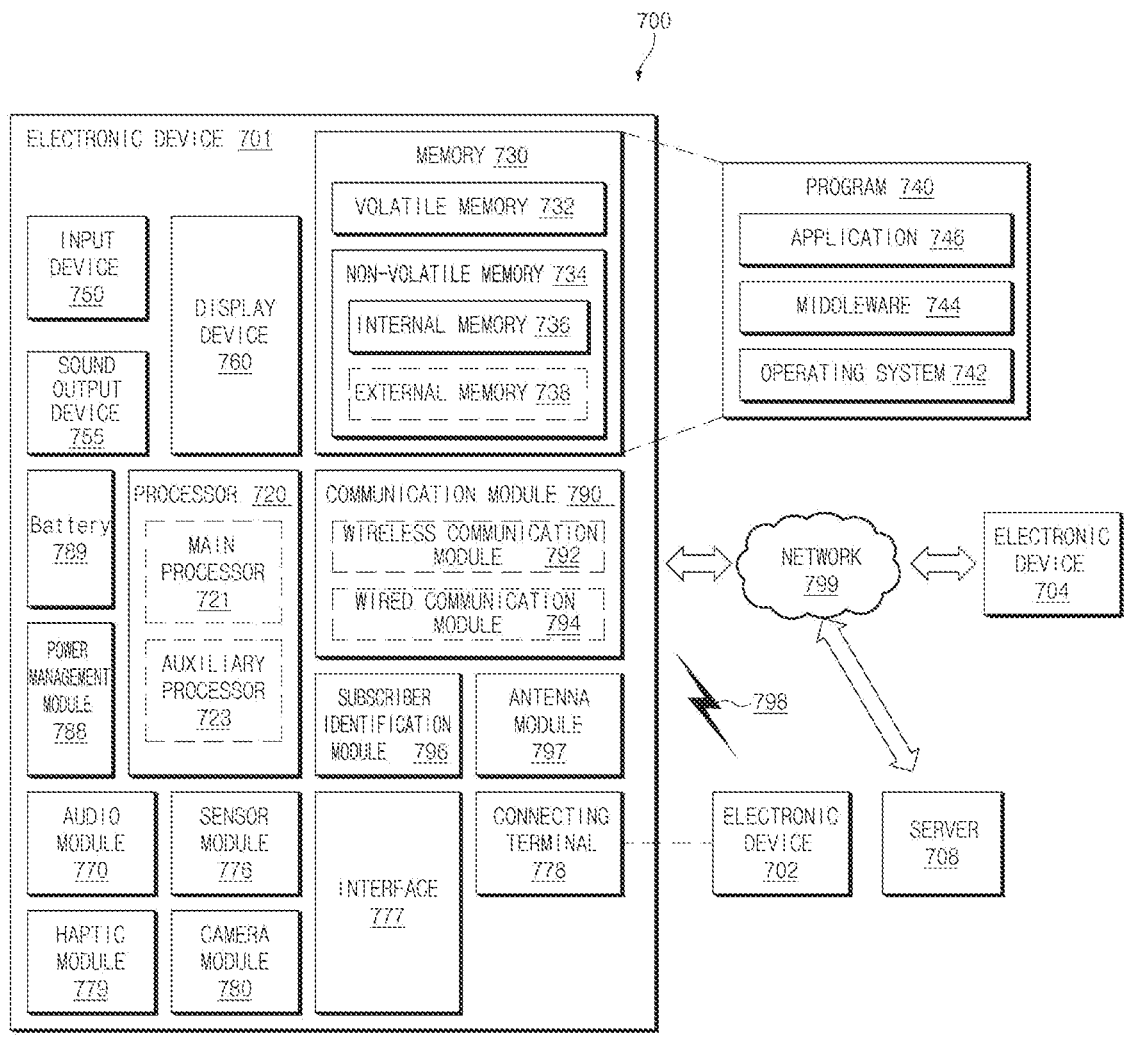
FIG. 7 is a block diagram illustrating an electronic device 701 in a network environment 700 according to various embodiments.

FIG. 7 is a block diagram illustrating an electronic device 701 in a network environment 700 according to various embodiments. Referring to FIG. 7, the electronic device 701 in the network environment 700 may communicate with an electronic device 702 via a first network 798 (e.g., a short-range wireless communication network), or an electronic device 704 or a server 708 via a second network 799 (e.g., a long-range wireless communication network). According to an embodiment, the electronic device 701 may communicate with the electronic device 704 via the server 708. According to an embodiment, the electronic device 701 may include a processor 720, memory 730, an input device 750, a sound output device 755, a display device 760, an audio module 770, a sensor module 776, an interface 777, a haptic module 779, a camera module 780, a power management module 788, a battery 789, a communication module 790, a subscriber identification module (SIM) 796, or an antenna module 797. In some embodiments, at least one (e.g., the display device 760 or the camera module 780) of the components may be omitted from the electronic device 701, or one or more other components may be added in the electronic device 701. In some embodiments, some of the components may be implemented as single integrated circuitry. For example, the sensor module 776 (e.g., a fingerprint sensor, an iris sensor, or an illuminance sensor) may be implemented as embedded in the display device 760 (e.g., a display).

The processor 720 may execute, for example, software (e.g., a program 740) to control at least one other component (e.g., a hardware or software component) of the electronic device 701 coupled with the processor 720, and may perform various data processing or computation. According to an example embodiment, as at least part of the data processing or computation, the processor 720 may load a command or data received from another component (e.g., the sensor module 776 or the communication module 790) in volatile memory 732, process the command or the data stored in the volatile memory 732, and store resulting data in non-volatile memory 734. According to an embodiment, the processor 720 may include a main processor 721 (e.g., a central processing unit (CPU) or an application processor (AP)), and an auxiliary processor 723 (e.g., a graphics processing unit (GPU), an image signal processor (ISP), a sensor hub processor, or a communication processor (CP)) that is operable independently from, or in conjunction with, the main processor 721. Additionally or alternatively, the auxiliary processor 723 may be adapted to consume less power than the main processor 721, or to be specific to a specified function. The auxiliary processor 723 may be implemented as separate from, or as part of the main processor 721.

The auxiliary processor 723 may control at least some of functions or states related to at least one component (e.g., the display device 760, the sensor module 776, or the communication module 790) among the components of the electronic device 701, instead of the main processor 721 while the main processor 721 is in an inactive (e.g., sleep) state, or together with the main processor 721 while the main processor 721 is in an active state (e.g., executing an application). According to an embodiment, the auxiliary processor 723 (e.g., an image signal processor or a communication processor) may be implemented as part of another component (e.g., the camera module 780 or the communication module 790) functionally related to the auxiliary processor 723.

The memory 730 may store various data used by at least one component (e.g., the processor 720 or the sensor module 776) of the electronic device 701. The various data may include, for example, software (e.g., the program 740) and input data or output data for a command related thereto. The memory 730 may include the volatile memory 732 or the non-volatile memory 734.

The program 740 may be stored in the memory 730 as software, and may include, for example, an operating system (OS) 742, middleware 744, or an application 746.

The input device 750 may receive a command or data to be used by other component (e.g., the processor 720) of the electronic device 701, from the outside (e.g., a user) of the electronic device 701. The input device 750 may include, for example, a microphone, a mouse, a keyboard, or a digital pen (e.g., a stylus pen).

The sound output device 755 may output sound signals to the outside of the electronic device 701. The sound output device 755 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 760 may visually provide information to the outside (e.g., a user) of the electronic device 701. The display device 760 may include, for example, a display, a hologram device, or a projector and control circuitry to control a corresponding one of the display, hologram device, and projector. According to an embodiment, the display device 760 may include touch circuitry adapted to detect a touch, or sensor circuitry (e.g., a pressure sensor) adapted to measure the intensity of force incurred by the touch.

The audio module 770 may convert a sound into an electrical signal and vice versa. According to an embodiment, the audio module 770 may obtain the sound via the input device 750, or output the sound via the sound output device 755 or a headphone of an external electronic device (e.g., an electronic device 702) directly (e.g., wiredly) or wirelessly coupled with the electronic device 701.

The sensor module 776 may detect an operational state (e.g., power or temperature) of the electronic device 701 or an environmental state (e.g., a state of a user) external to the electronic device 701, and then generate an electrical signal or data value corresponding to the detected state. According to an embodiment, the sensor module 776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 777 may support one or more specified protocols to be used for the electronic device 701 to be coupled with the external electronic device (e.g., the electronic device 702) directly (e.g., wiredly) or wirelessly. According to an embodiment, the interface 777 may include, for example, a high definition multimedia interface (HDMI), a universal serial bus (USB) interface, a secure digital (SD) card interface, or an audio interface.

A connecting terminal 778 may include a connector via which the electronic device 701 may be physically connected with the external electronic device (e.g., the electronic device 702). According to an embodiment, the connecting terminal 778 may include, for example, a HDMI connector, a USB connector, a SD card connector, or an audio connector (e.g., a headphone connector).

The haptic module 779 may convert an electrical signal into a mechanical stimulus (e.g., a vibration or a movement) or electrical stimulus which may be recognized by a user via his tactile sensation or kinesthetic sensation. According to an embodiment, the haptic module 779 may include, for example, a motor, a piezoelectric element, or an electric stimulator.

The camera module 780 may capture a still image or moving images. According to an embodiment, the camera module 780 may include one or more lenses, image sensors, image signal processors, or flashes.

The power management module 788 may manage power supplied to the electronic device 701. According to an example embodiment, the power management module 788 may be implemented as at least part of, for example, a power management integrated circuit (PMIC).

The battery 789 may supply power to at least one component of the electronic device 701. According to an embodiment, the battery 789 may include, for example, a primary cell which is not rechargeable, a secondary cell which is rechargeable, or a fuel cell.

The communication module 790 may support establishing a direct (e.g., wired) communication channel or a wireless communication channel between the electronic device 701 and the external electronic device (e.g., the electronic device 702, the electronic device 704, or the server 708) and performing communication via the established communication channel. The communication module 790 may include one or more communication processors that are operable independently from the processor 720 (e.g., the application processor (AP)) and supports a direct (e.g., wired) communication or a wireless communication. According to an embodiment, the communication module 790 may include a wireless communication module 792 (e.g., a cellular communication module, a short-range wireless communication module, or a global navigation satellite system (GNSS) communication module) or a wired communication module 794 (e.g., a local area network (LAN) communication module or a power line communication (PLC) module). A corresponding one of these communication modules may communicate with the external electronic device via the first network 798 (e.g., a short-range communication network, such as Bluetooth, wireless-fidelity (Wi-Fi) direct, or infrared data association (IrDA)) or the second network 799 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 792 may identify and authenticate the electronic device 701 in a communication network, such as the first network 798 or the second network 799, using subscriber information (e.g., international mobile subscriber identity (IMSI)) stored in the subscriber identification module 796.

The antenna module 797 may transmit or receive a signal or power to or from the outside (e.g., the external electronic device) of the electronic device 701. According to an embodiment, the antenna module 797 may include an antenna including a radiating element composed of a conductive material or a conductive pattern formed in or on a substrate (e.g., PCB). According to an embodiment, the antenna module 797 may include a plurality of antennas. In such a case, at least one antenna appropriate for a communication scheme used in the communication network, such as the first network 798 or the second network 799, may be selected, for example, by the communication module 790 (e.g., the wireless communication module 792) from the plurality of antennas. The signal or the power may then be transmitted or received between the communication module 790 and the external electronic device via the selected at least one antenna. According to an embodiment, another component (e.g., a radio frequency integrated circuit (RFIC)) other than the radiating element may be additionally formed as part of the antenna module 797.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 701 and the external electronic device 704 via the server 708 coupled with the second network 799. Each of the electronic devices 702 and 704 may be a device of a same type as, or a different type, from the electronic device 701. According to an embodiment, all or some of operations to be executed at the electronic device 701 may be executed at one or more of the external electronic devices 702, 704, or 708. For example, if the electronic device 701 should perform a function or a service automatically, or in response to a request from a user or another device, the electronic device 701, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 701. The electronic device 701 may provide the outcome, with or without further processing of the outcome, as at least part of a reply to the request. To that end, a cloud computing, distributed computing, or client-server computing technology may be used, for example.

An electronic device according to an example embodiment may include a robot arm including at least one coupling portion configured to be coupled to a force sensor to which a specified object is attached, at least one actuator configured to drive the robot arm such that a position of the at least one coupling portion is changed, and a processor electrically connected to the actuator, wherein the processor is configured to: receive a first measurement value of the force sensor due to a weight of the specified object with respect to a first position of the at least one coupling portion, receive a second measurement value of the force sensor due to the weight of the specified object with respect to a second position of the at least one coupling portion, receive a third measurement value of the force sensor due to the weight of the specified object with respect to a third position of the at least one coupling portion, and estimate a relationship between a first coordinate system relative to the at least one coupling portion and a second coordinate system relative to the force sensor based at least on the first measurement value, the second measurement value, and the third measurement value to calculate a magnitude of an external force acting on the specified object.

According to an example embodiment, the processor may be configured to estimate a mass of the specified object based at least on the first measurement value, the second measurement value, and the third measurement value, and estimate a relationship between the first coordinate system and the second coordinate system relative to the estimated mass.

According to an example embodiment, the processor may be configured to estimate an offset parameter of the force sensor based on the estimated relationship between the first coordinate system and the second coordinate system.

According to an example embodiment, the offset parameter may include at least one of a mass of the specified object, a distance between an origin of the first coordinate system and a center of gravity of the specified object, a bias force of the force sensor, or a bias torque of the force sensor.

According to an example embodiment, the processor may be configured to measure the external force based on the second coordinate system relative to at least the estimated relationship.

According to an example embodiment, the processor may be configured to measure the external force based on the first coordinate system based on the measured external force based on the second coordinate system, calculate at least one velocity command based at least on the measured external force based on the first coordinate system, and control the actuator to drive the robot arm based on the calculated velocity command.

According to an example embodiment, the processor may be configured to obtain position information of the at least one coupling portion and obtain a relationship between the first coordinate system and a third coordinate system relative to the at least one coupling portion based on the obtained position information.

A method for calculating at least one parameter for measuring an external force, according to an example embodiment may include receiving a first measurement value of a force sensor due to a weight of a specified object with respect to a first position of at least one coupling portion configured to be coupled to the force sensor to which the specified object is attached, receiving a second measurement value of the force sensor due to the weight of the specified object with respect to a second position of the at least one coupling portion, receiving a third measurement value of the force sensor due to the weight of the specified object with respect to a third position of the at least one coupling portion, and estimating a relationship between a first coordinate system relative to the at least one coupling portion and a second coordinate system relative to the force sensor based at least on the first measurement value, the second measurement value, and the third measurement value to calculate a magnitude of an external force acting on the specified object.

According to an example embodiment, the method may further include estimating a mass of the specified object based at least on the first measurement value, the second measurement value, and the third measurement value, wherein the estimating of the relationship between the first coordinate system relative to the at least one coupling portion and the second coordinate system relative to the force sensor, based at least on the first measurement value, the second measurement value, and the third measurement value to calculate the magnitude of the external force acting on the specified object may include estimating a relationship between the first coordinate system and the second coordinate system based on the estimated mass.

According to an example embodiment, the method may further include estimating an offset parameter of the force sensor based on the estimated relationship between the first coordinate system and the second coordinate system.

According to an example embodiment, the offset parameter may include at least one of a mass of the specified object, a distance between an origin of the first coordinate system and a center of gravity of the specified object, a bias force of the force sensor, or a bias torque of the force sensor.

According to an example embodiment, the method may further include measuring the external force based on the second coordinate system relative to at least the estimated relationship.

According to an example embodiment, the method may further include measuring the external force based on the first coordinate system based on the measured external force based on the second coordinate system, calculating at least one velocity command based at least on the measured external force based on the first coordinate system, and controlling the actuator to drive the robot arm based on the calculated velocity command.

According to an example embodiment, the method may further include obtaining position information of the at least one coupling portion, and obtaining a relationship between the first coordinate system and a third coordinate system relative to the at least one coupling portion based on the obtained position information.

A computer-readable storage medium according to an embodiment may store instructions executable by a processor, wherein the instructions, when executed by the processor, cause a processor of an electronic device to: receive a first measurement value of a force sensor due to a weight of a specified object with respect to a first position of at least one coupling portion configured to be coupled to the force sensor to which the specified object is attached, receive a second measurement value of the force sensor due to the weight of the specified object with respect to a second position of the at least one coupling portion, receive a third measurement value of the force sensor due to the weight of the specified object with respect to a third position of the at least one coupling portion; and estimate a relationship between a first coordinate system relative to the at least one coupling portion and a second coordinate system relative to the force sensor based at least on the first measurement value, the second measurement value, and the third measurement value to calculate a magnitude of an external force acting on the specified object.

According to an example embodiment, the instructions may, when executed, cause the processor of the electronic device to estimate a mass of the specified object based at least on the first measurement value, the second measurement value, and the third measurement value, and estimate a relationship between the first coordinate system and the second coordinate system relative to the estimated mass.

According to an example embodiment, the instructions may, when executed, cause the processor of the electronic device to estimate an offset parameter of the force sensor based on the estimated relationship between the first coordinate system and the second coordinate system.

According to an example embodiment, the instructions may, when executed, cause the processor of the electronic device to measure the external force based on the second coordinate system relative to at least the estimated relationship.

According to an example embodiment, the instructions may, when executed, cause the processor of the electronic device to measure the external force based on the first coordinate system based on the measured external force based on the second coordinate system, calculate at least one velocity command based at least on the measured external force based on the first coordinate system, and control the actuator to drive the robot arm based on the calculated velocity command.

According to an example embodiment, the instructions may, when executed, cause the processor of the electronic device to obtain position information of the at least one coupling portion, and obtain a relationship between the first coordinate system and a third coordinate system relative to the at least one coupling portion based on the obtained position information.

According to the various example embodiments disclosed in the disclosure, the electronic device may estimate and obtain relationship between the coupling portion of the electronic device and the force sensor even though the relationship is not known in advance. Thus, the electronic device may more accurately measure the external force. In addition, the electronic device may compensate for errors that may occur in the process of attaching and detaching the force sensor, and may improve the control ability of the robot arm.

According to the various example embodiments disclosed herein, the electronic device may more accurately measure an external force. In addition, the electronic device may compensate for errors that may occur in the process of attaching and detaching the force sensor, and may improve ability of controlling a robot arm. In addition various effects directly or indirectly understood through the disclosure may be provided.

The electronic device according to various example embodiments may be one of various types of electronic devices. The electronic devices may include, for example, and without limitation, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various example embodiments of the present disclosure and the terms used therein are not intended to limit the technological features set forth herein to particular embodiments and include various changes, equivalents, and/or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, firmware, or any combinations thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various example embodiments as set forth herein may be implemented as software (e.g., the program 740) including one or more instructions that are stored in a storage medium (e.g., internal memory 736 or external memory 738) that is readable by a machine (e.g., the electronic device 701). For example, a processor (e.g., the processor 720) of the machine (e.g., the electronic device 701) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments thereof, it will be understood by those skilled in the art that various changes in form and details may be made therein without departing from the spirit and scope of the disclosure as defined, for example, by the appended claims and their equivalents.

What is claimed is:

1. An electronic device, comprising:
    a robot arm including at least one coupling portion coupled to a force sensor to which a specified object is attached;
    at least one actuator electrically connected to the robot arm and configured to drive the robot arm such that a position of the at least one coupling portion is changed; and
    a processor electrically connected to the actuator,
    wherein the processor is configured to:
        receive a first measurement value of the force sensor due to a weight of the specified object with respect to a first position of the at least one coupling portion,
        receive a second measurement value of the force sensor due to the weight of the specified object with respect to a second position of the at least one coupling portion,
        receive a third measurement value of the force sensor due to the weight of the specified object with respect to a third position of the at least one coupling portion, and
        estimate a relationship between a first coordinate system relative to the electronic device and a second coordinate system relative to the force sensor based at least on the first measurement value, the second measurement value, and the third measurement value,
        measure an external force acting on the specified object based on the second coordinate system,
        calculate a magnitude of the external force acting on the specified object based on the measured external force and the estimated relationship between the first coordinate system and the second coordinate system, and
        control the actuator to drive the robot arm based on the calculated magnitude of the external force,
        wherein the first, second, and third measurement values are received at the first, second, and third positions of the at least one coupling portion, respectively, before the external force is acted on the specified object and the first, second, and third positions are different from each other.

2. The electronic device of claim 1, wherein the processor is configured to:
    estimate a mass of the specified object based at least on the first measurement value, the second measurement value, and the third measurement value, and
    estimate a relationship between the first coordinate system and the second coordinate system relative to the estimated mass.

3. The electronic device of claim 1, wherein the processor is configured to estimate an offset parameter of the force sensor based on the estimated relationship between the first coordinate system and the second coordinate system.

4. The electronic device of claim 3, wherein the offset parameter includes at least one of a mass of the specified object, a distance between an origin of the first coordinate system and a center of gravity of the specified object, a bias force of the force sensor, or a bias torque of the force sensor.

5. The electronic device of claim 1, wherein the processor is configured to:
measure the external force in the first coordinate system based on the measured external force in the second coordinate system, and
calculate at least one velocity command based at least on the measured external force in the first coordinate system,
wherein the actuator to drive the robot arm is controlled based on the calculated velocity command.

6. The electronic device of claim 1, wherein the processor is configured to:
obtain position information of the at least one coupling portion, and
obtain a relationship between the first coordinate system and a third coordinate system relative to the at least one coupling portion based on the obtained position information.

7. A method for controlling a robot arm of an electronic device, the robot arm including at least one coupling portion coupled to a force sensor to which a specified object is attached, the method comprising:
receiving a first measurement value of the force sensor due to a weight of the specified object with respect to a first position of the at least one coupling portion configured to be coupled to the force sensor to which the specified object is attached;
receiving a second measurement value of the force sensor due to the weight of the specified object with respect to a second position of the at least one coupling portion;
receiving a third measurement value of the force sensor due to the weight of the specified object with respect to a third position of the at least one coupling portion; and
estimating a relationship between a first coordinate system relative to the electronic device and a second coordinate system relative to the force sensor based at least on the first measurement value, the second measurement value, and the third measurement value;
measuring an external force acting on the specified object based on the second coordinate system;
calculating a magnitude of the external force acting on the specified object based on the measured external force and the estimated relationship between the first coordinate system and the second coordinate system; and
controlling an actuator electrically connected to the robot arm to drive the robot arm based on the calculated magnitude of the external force,
wherein the first, second, and third measurement values are received at the first, second, and third positions of the at least one coupling portion, respectively, before the external force is acted on the specified object and the first, second, and third positions are different from each other.

8. The method of claim 7, further comprising:
estimating a mass of the specified object based at least on the first measurement value, the second measurement value, and the third measurement value,
wherein the estimating of the relationship between the first coordinate system relative to the at least one coupling portion and the second coordinate system relative to the force sensor based at least on the first measurement value, the second measurement value, and the third measurement value to calculate the magnitude of the external force acting on the specified object, includes estimating a relationship between the first coordinate system and the second coordinate system based on the estimated mass.

9. The method of claim 7, further comprising:
estimating an offset parameter of the force sensor based on the estimated relationship between the first coordinate system and the second coordinate system.

10. The method of claim 9, wherein the offset parameter includes at least one of a mass of the specified object, a distance between an origin of the first coordinate system and a center of gravity of the specified object, a bias force of the force sensor, or a bias torque of the force sensor.

11. The method of claim 7, further comprising:
measuring the external force in the first coordinate system based on the measured external force in the second coordinate system; and
calculating at least one velocity command based at least on the measured external force based on the first coordinate system,
wherein the actuator to drive the robot arm is controlled based on the calculated velocity command.

12. The method of claim 7, further comprising:
obtaining position information of the at least one coupling portion, and
obtaining a relationship between the first coordinate system and a third coordinate system relative to the at least one coupling portion based on the obtained position information.

13. A non-transitory computer-readable storage medium storing instructions executable by a processor of an electronic device including a robot arm, the robot arm including at least one coupling portion coupled to a force sensor to which a specified object is attached, the instructions when executed, cause the processor to:
receive a first measurement value of the force sensor due to a weight of the specified object with respect to a first position of the at least one coupling portion configured to be coupled to the force sensor to which the specified object is attached;
receive a second measurement value of the force sensor due to the weight of the specified object with respect to a second position of the at least one coupling portion;
receive a third measurement value of the force sensor due to the weight of the specified object with respect to a third position of the at least one coupling portion; and
estimate a relationship between a first coordinate system relative to the electronic device and a second coordinate system relative to the force sensor, based at least on the first measurement value, the second measurement value, and the third measurement value;
measure an external force acting on the specified object based on the second coordinate system;
calculate a magnitude of the external force acting on the specified object based on the measured external force and the estimated relationship between the first coordinate system and the second coordinate system; and
control an actuator electrically connected to the robot arm to drive the robot arm based on the calculated magnitude of the external force, wherein the first, second, and third measurement values are received at the first, second, and third positions of the at least one coupling portion, respectively, before the external force is acted on the specified object and the first, second, and third positions are different from each other.

14. The computer-readable storage medium of claim 13, wherein the instructions, when executed, cause the processor of the electronic device to:
   estimate a mass of the specified object based at least on the first measurement value, the second measurement value, and the third measurement value, and
   estimate a relationship between the first coordinate system and the second coordinate system relative to the estimated mass.

15. The computer-readable storage medium of claim 13, wherein the instructions, when executed, cause the processor of the electronic device to estimate an offset parameter of the force sensor based on the estimated relationship between the first coordinate system and the second coordinate system.

16. The computer-readable storage medium of claim 13, wherein the instructions, when executed, cause the processor of the electronic device to:
   measure the external force in the first coordinate system based on the measured external force in the second coordinate system, and
   calculate at least one velocity command based at least on the measured external force based on the first coordinate system,
   wherein the actuator to drive the robot arm is controlled based on the calculated velocity command.

17. The computer-readable storage medium of claim 13, wherein the instructions, when executed, cause the processor of the electronic device to:
   obtain position information of the at least one coupling portion, and
   obtain a relationship between the first coordinate system and a third coordinate system relative to the at least one coupling portion based on the obtained position information.

* * * * *